United States Patent [19]
Takahashi et al.

[11] Patent Number: 5,270,738
[45] Date of Patent: Dec. 14, 1993

[54] LIQUID JET RECORDING APPARATUS HAVING ROTARY TRANSMITTING MEMBER FOR RECORDING MEDIUM

[75] Inventors: Haruhiko Takahashi, Yokohama; Makoto Takamiya, Kawasaki; Hidejiro Kadowaki, Yokohama; Ken Tsuchii; Toshiyuki Yanaka, both of Tokyo; Masafumi Wataya, Kawasaki; Kosuke Yamamoto, Yokohama, all of Japan

[73] Assignee: Canon Kabushiki Kaisha, Tokyo, Japan

[21] Appl. No.: 598,136

[22] Filed: Oct. 16, 1990

Related U.S. Application Data

[63] Continuation of Ser. No. 435,991, Nov. 14, 1989, abandoned.

[30] Foreign Application Priority Data

Nov. 15, 1988 [JP] Japan .............. 63-286867

[51] Int. Cl.⁵ .............................................. B41J 2/165
[52] U.S. Cl. .................................................. 346/140 R
[58] Field of Search ............... 346/140, 134, 75

[56] References Cited

U.S. PATENT DOCUMENTS

| | | | |
|---|---|---|---|
| 3,560,641 | 2/1971 | Taylor et al. ............... | 178/6.6 |
| 3,981,020 | 9/1976 | Takano et al. ............... | 346/75 |
| 4,207,578 | 6/1980 | Marinoff ....................... | 346/75 |
| 4,208,666 | 6/1980 | Paranjpe ...................... | 346/134 X |
| 4,237,466 | 12/1980 | Scranton ..................... | 346/134 |
| 4,313,124 | 1/1982 | Hara ............................. | 346/140 R |
| 4,337,467 | 6/1982 | Yano ............................ | 346/1.1 |
| 4,559,543 | 12/1985 | Toganoh et al. ............. | 346/140 R |
| 4,695,855 | 9/1987 | Ichihashi et al. ............ | 346/145 |
| 4,703,333 | 10/1987 | Hubbard ...................... | 346/140 R |
| 4,745,414 | 5/1988 | Okamura et al. ............ | 346/140 R |
| 4,887,101 | 12/1989 | Hirose et al. ................ | 346/134 |
| 4,920,258 | 4/1990 | Saito ............................ | 346/134 |

FOREIGN PATENT DOCUMENTS

| | | |
|---|---|---|
| 0241118 | 10/1987 | European Pat. Off. . |
| 813016 | 7/1951 | Fed. Rep. of Germany . |
| 1299657 | 7/1969 | Fed. Rep. of Germany . |
| 1941680 | 4/1970 | Fed. Rep. of Germany . |
| 1761807 | 8/1971 | Fed. Rep. of Germany . |
| 3151220 | 8/1982 | Fed. Rep. of Germany . |
| 3215276 | 12/1982 | Fed. Rep. of Germany . |
| 3236297 | 4/1983 | Fed. Rep. of Germany . |
| 56-092070 | 7/1981 | Japan . |
| 1579900 | 11/1980 | United Kingdom . |
| 2110854 | 6/1983 | United Kingdom . |

OTHER PUBLICATIONS

G. T. Slaughter, "Ink Jet Printer/Copier," IBM Technical Disclosure Bulletin, vol. 21, No. 2, Jul. 1978.

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

The present invention relates to a liquid jet recording apparatus in which a liquid discharge for recovery of a recording head is directly carried out by the conveying belt. A collecting effect of an ink mist generated at a recording area of the recording head is carried out by a charged conveying belt, a rotary member conveying the recording medium, preferably an electrostatically absorbing conveying belt.

29 Claims, 6 Drawing Sheets

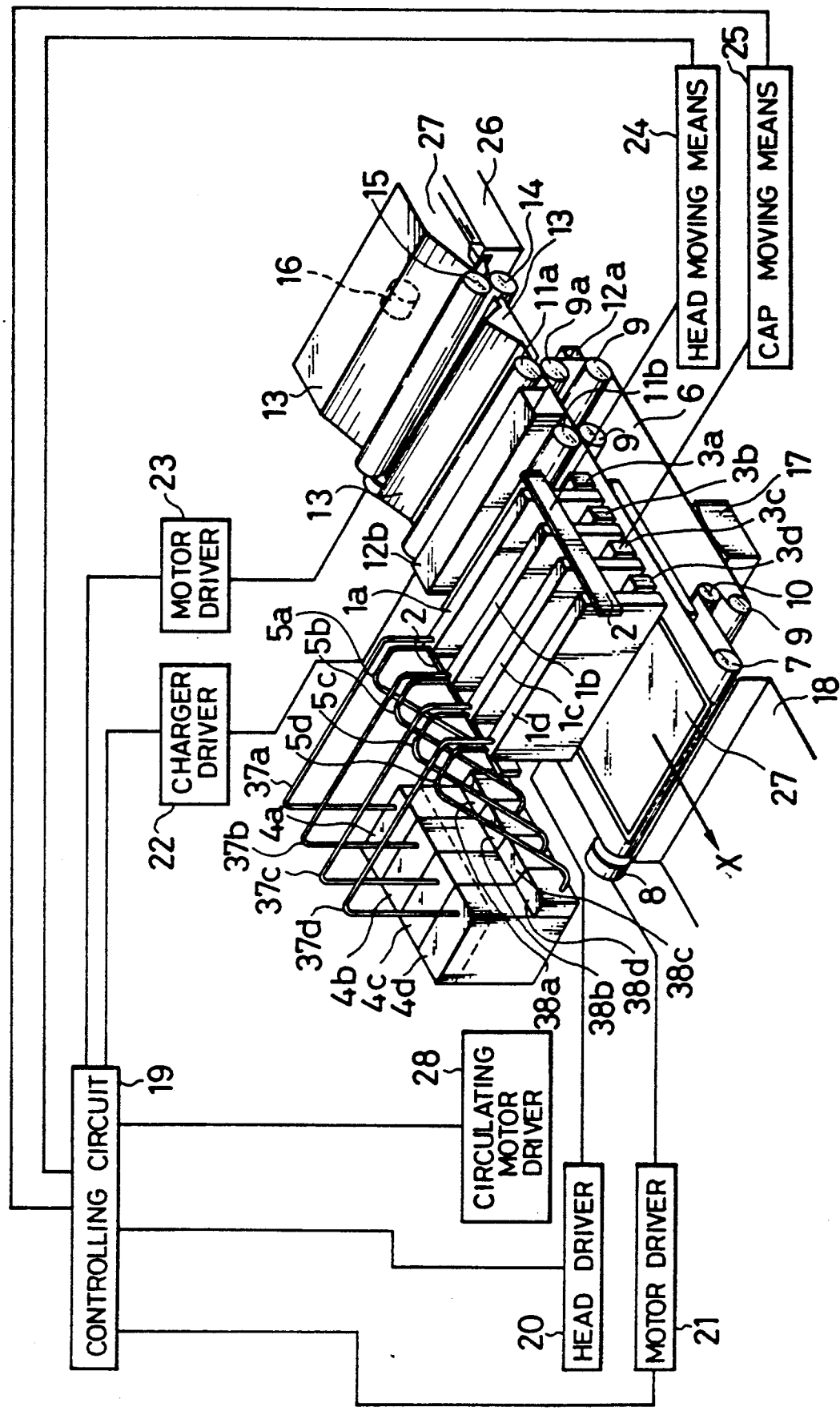

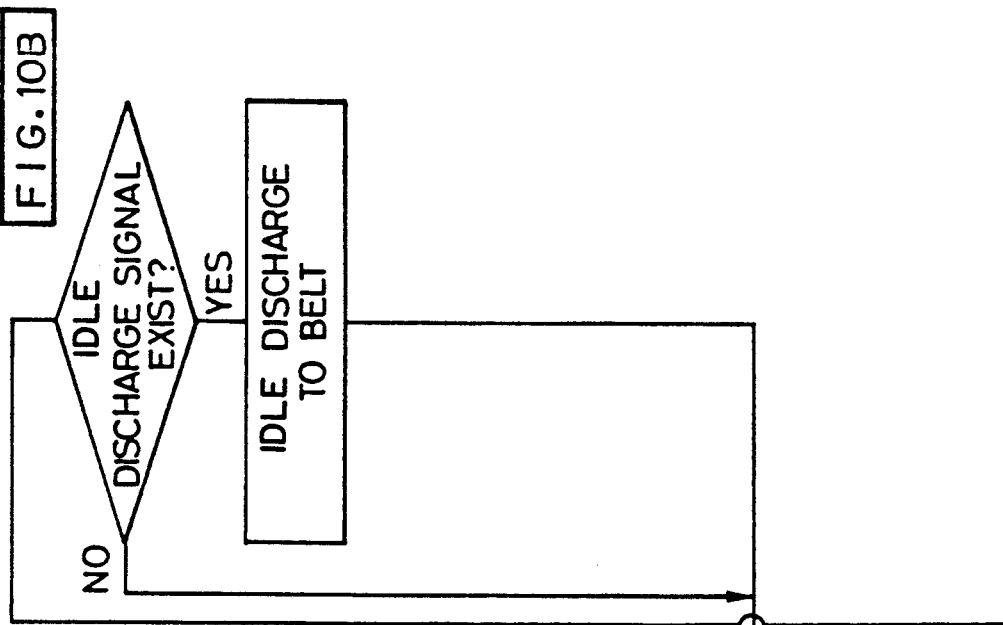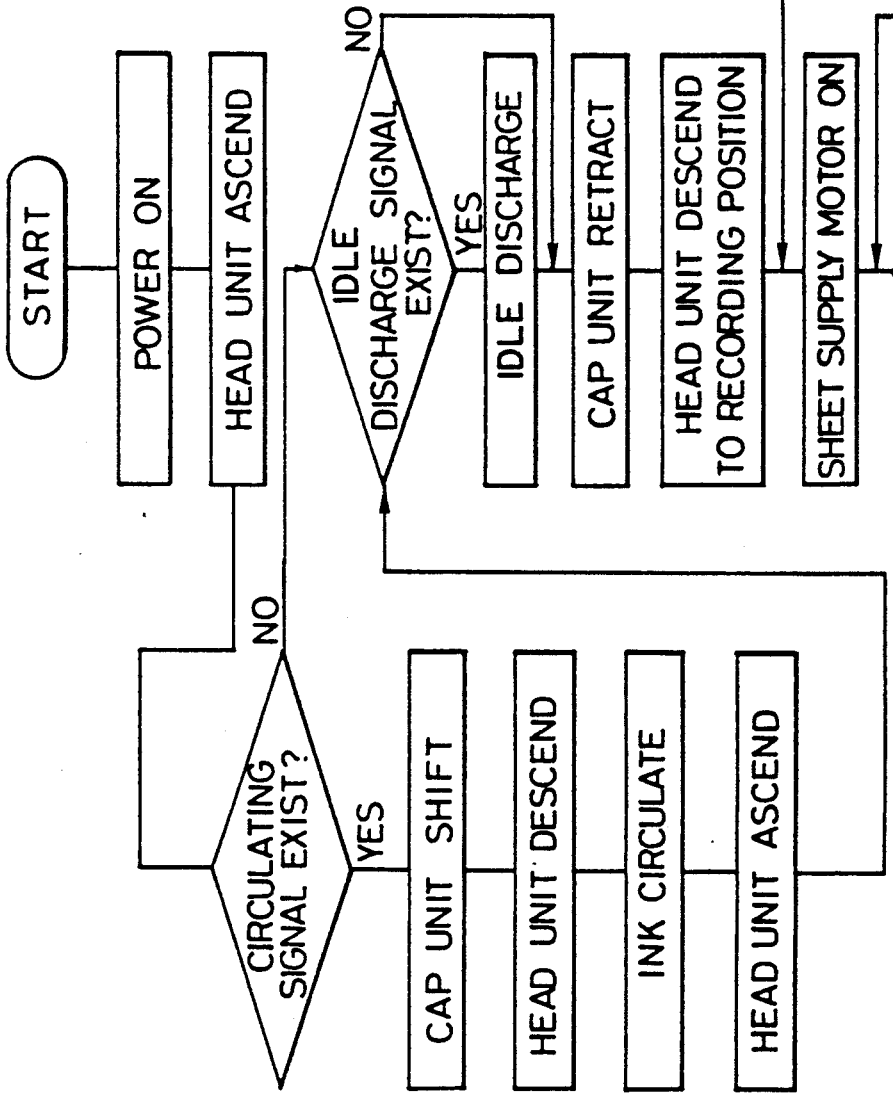

LIQUID JET RECORDING APPARATUS HAVING ROTARY TRANSMITTING MEMBER FOR RECORDING MEDIUM

This application is a continuation of application Ser. No. 07/435,991 filed Nov. 14, 1989, now abandoned.

BACKGROUND OF THE INVENTION

1. Field of the Invention

The present invention relates to a liquid jet recording apparatus which is made compact by utilizing a rotary type conveying belt or roller as a conveying member of the recording medium, and especially relates to a full line recording apparatus whose recording head is enlarged, or full color recording apparatus whose recording area is increased.

2. Related Background Art

Liquid jet recording apparatuses (ink jet recording apparatuses) each of which can perform the recording of information such as characters and/or images by discharging recording liquid from a recording head have widely been known.

A recording medium mainly receiving the recording comprising a paper or a plastic sheet has been used with the liquid jet recording apparatus of this kind. Such liquid jet recording apparatus has been adopted to a recording output apparatus of a computer, word processor and the like, since it has less noise in the recording operation and simpler mechanical construction and is more inexpensive, than other recording systems.

However, in such liquid jet recording apparatus, since the recording is performed by directly discharging the recording liquid (referred to as "ink" hereinafter) from a nozzle of the recording head, special attention must be paid to always keep the ink in a dischargeable condition, which is not needed in other recording systems.

That is to say, since the ink exists in the nozzle of the recording head even when the apparatus is in an inoperative condition, it's necessary to prevent the ink in the nozzle from drying, and the change in quality of the ink, for example, due to increase in the viscosity of ink caused by evaporation of moisture in the ink must also be prevented. To this end, a socalled capping means for covering the orifice of the recording head by means of a cap thereby preventing the drying and/or evaporation of the ink in the inoperative condition of the recording apparatus has been proposed.

However, under the low moisture condition, or when the recording apparatus is not operated for a long time, the increase in the viscosity of ink cannot be avoided adequately only by the capping means. Accordingly, as well as the capping means, there has been provided a head restoring mechanism which produces the negative pressure in the orifice of the recording head by sucking the air within the cap covering the recording head so that the ink remaining in the nozzle of the recording head is drawn out or which produces the pressure in the nozzle by means of a pump and the like so that the deteriorated ink is discharged from the orifice of the recording head.

Further, in some cases, the quality of the ink in the unused nozzle or nozzles is changed or deteriorated even during the recording operation.

That is to say, in the ink jet recording apparatus having a plurality of recording heads, there will be a orifice or orifices which are not used for a long time even during the recording operation in accordance with the kind of the information to be recorded. More particularly, in some nozzle or nozzles, the time interval between the discharge of the ink and the next discharge of the ink will be very long. In this way, the discharge frequencies or periods of the ink from the respective nozzles vary in relation to each other. Therefore, in the nozzle having the lesser discharge frequency or longer time interval between two successive ink discharges, the viscosity of the ink will be increased due to the drying thereof according to the surrounding conditions such as humidity and/or temperature, which results in the unstable discharge or the non-discharge of the ink from the nozzle.

To avoid this, the idle discharge, or pre-discharge has been carried out (for non-recording purpose) from each nozzle toward an ink absorbing member provided in the capping means for predetermined time intervals.

In addition, in a recording apparatus adopting one of full line or color recording, or in full line scan type requiring high speed recording "fog" like mist is generated in the recording area space formed between the recording head and the recording medium upon recording because a large amount of ink advances toward the recording medium. The technique adopting attracting means for solving the above problem has been known.

SUMMARY OF THE INVENTION

It is a primary object of the present invention to provide the liquid jet recording apparatus capable of removing or eliminating the ink which does not contribute to formation of the recording image but is inevitably generated upon recording, for example, ink for idle discharge, or pre-discharge or ink mist, and capable of being compact the recording apparatus.

It is another object of the present invention to provide the liquid jet recording apparatus having the idle discharge, or pre-discharge mechanism so as not to deteriorate the recording speed, in view of the defect that the recording head should be retracted from the recording position for discharging the ink toward the ink attracting member in the capping means, which greatly deteriorates a through top in the continuous sheet supply, i.e., the recording speed.

It is still another object of the present invention to provide the liquid jet recording apparatus capable of being compact as well as efficient elimination of the ink mist, by utilizing a conveying belt conveying the recording medium, so that it eliminates the ink mist generated in the recording area from the space of recording area.

Still another object of the present invention is to provide the liquid jet recording apparatus including recording means for carrying out recording by discharging liquid rotary conveying means for conveying a recording medium to which the liquid is applied by said recording means; and recovery means for causing said recording means to carry out a liquid discharge onto a surface of said rotary conveying means.

Still another object of the present invention is to provide the liquid jet recording apparatus including recording means for discharging ink for recording; conveying means for conveying a recording medium to which the liquid is applied by said recording means, the conveying means having a conveying belt moving endlessly and conveying belt charging means electrostatically attracting the recording medium to said conveying belt; controlling means for supplying the conveying belt charged by the charging means to a recording area by the recording means by length with respect to the conveying direction, after completion of recording of the recording medium by said recording means; and cleaning means for cleaning said conveying means.

Still another object of the present invention is to provide the liquid jet recording apparatus including recording means for setting a liquid to a recording medium by forming an air bubble by a film boiling in the liquid by applying an electric signal corresponding to the recording signal to a recording head provided with an electro-thermal converting element for forming an air bubble by applying thermal energy into the liquid. The recording means is provided with a recording head having a discharge portion of a length corresponding to a width of said recording medium in the conveying direction thereof; an endless conveying belt for electrostatically attracting the recording medium; and charging means for charging the conveying belt including a surface thereof located between adjacent recording media in a plural recording media conveying mode of the conveying belt.

The most significant object of the present invention is to provide the liquid jet recording apparatus, including recording means for discharging ink for recording; conveying means for conveying a recording medium to which the liquid is applied by said recording means, the conveying means having a conveying belt moving endlessly and conveying belt charging means electrostatically attracting the recording medium to the conveying belt; controlling means for supplying the conveying belt charged by said charging means to a recording area by the recording means by length with respect to the conveying direction, after completion of recording of the recording medium by the recording means; and cleaning means for cleaning the conveying means.

A liquid Jet recording apparatus can be the one including recording means for jetting a liquid to a recording medium by forming an air bubble by a film boiling in the liquid by applying an electric signal corresponding to the recording signal to a recording head provided with an electro-thermal converting element for forming an air bubble by applying thermal energy into the liquid. The recording means is provided with a recording head having a discharge portion of a length corresponding to a width of the recording medium in the conveying direction thereof; an endless conveying belt for electrostatically attracting the recording medium; and charging means for charging the conveying belt including a surface thereof located between adjacent recording media in a plural recording media conveying mode of the conveying belt.

The recording means includes controlling means for supplying the conveying belt charged by the charging means to a recording area by the recording means by length with respect to the conveying direction after completion of recording of the recording medium by the recording means, and cleaning means for cleaning the conveying means.

The controlling means supplies the conveying belt until a surface of the conveying belt charged after completion of recording passes by a cleaning acting area by the cleaning means.

BRIEF DESCRIPTION OF THE DRAWINGS

FIG. 1 is a whole constructural view of a liquid jet recording apparatus according to a preferred embodiment of the present invention;

DETAILED DESCRIPTION OF THE PREFERRED EMBODIMENTS

The present invention will now be explained in connection with embodiments thereof with reference to the accompanying drawings.

FIG. 1 shows an embodiment of the present invention.

A liquid jet recording apparatus according to the present invention shown in FIG. 1 comprises a recording head unit 1 which has 3456 nozzles at intervals of 16 dot/mm to record an image having a width of 216 mm in a line recording fashion and which includes four recording heads 1a, 1b, 1c and 1d for black ink, cyan ink, magenta ink and yellow ink, respectively.

Figure 2:
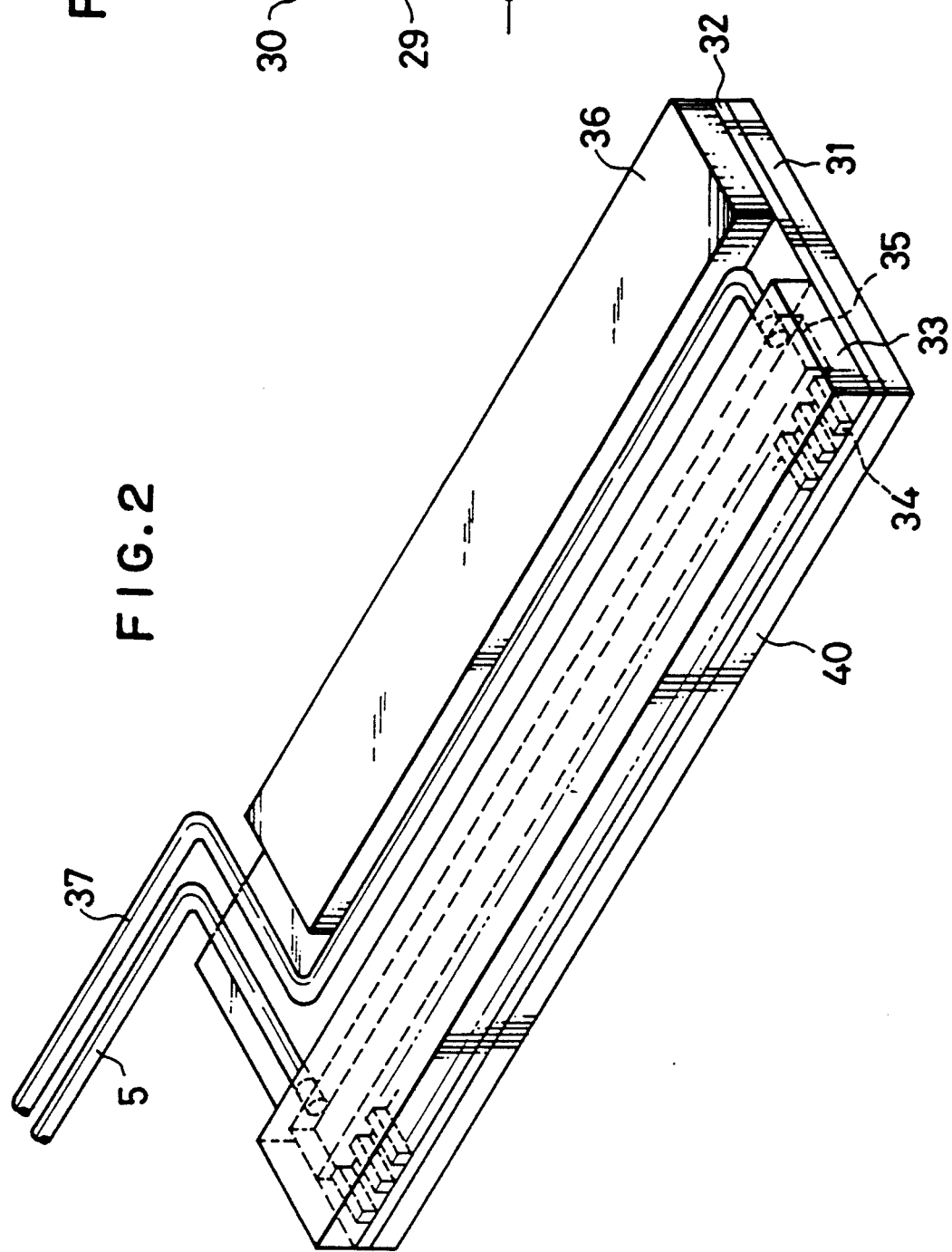
FIG. 2 is a perspective view of a recording head of the apparatus of FIG. 1.

FIG. 2 is a perspective view of the recording head which comprises an aluminum head base 31, a silicone substrate 32 including heating elements connected to nozzles 34, a glass cover 33 defining a common ink chamber 35 and the nozzles 34, a driver 36 for activating the heating elements, and an ink return tube 37 for returning the ink supplied from an ink supply tube 5 into the ink chamber 35 to an ink tank. In this recording head, an orifice surface 40 is defined in front of the nozzles 34. Each recording head is supported by holders 2 in such a manner that the recording heads are positioned equidistantly in a direction to which a recording medium is fed. The recording head unit comprising the four recording heads and the holders can be shifted in an up-and-down direction by means of a head shifting means 24.

Figure 3:
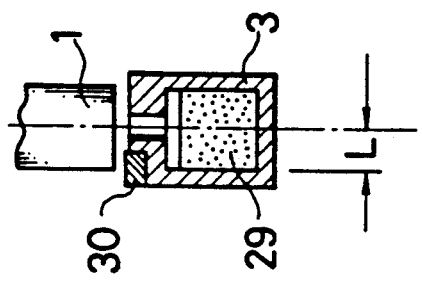
FIG. 3 is a sectional view of a cap of the apparatus of FIG. 1.

Cap unit 3 includes caps 3a-3d mounted on the respective orifice surfaces 40 of the respective recording heads 1a-1d constituting nozzles liquid jet recording apparatus is not in use. As shown in FIG. 3 (this Figure illustrates a condition that the recording head unit 1 is aligned with the cap unit 3 in a single plane), each cap has a sponge ink absorbing member 29 therein, which member serves to receive the ink discharged for non recording purpose. Further, the cap is provided at its upper surface with a nozzle holder rubber 30 extending along the length of the nozzle array. The cap unit 3 can be shifted in a direction X (FIG. 1) by means of a cap shifting means 25 (FIG. 1).

Ink tanks 4 are provided, which include ink tanks 4a-4d corresponding to the recording heads 1a-1d. The ink in each ink tanks 4a-4d is supplied to the corresponding recording head 1a-1d through the corresponding ink supply tube 5a-5d. The supply of the ink is effected by the use of capillarity of the nozzle of the recording head, and the liquid level (water head) of the ink in each ink tank is so set as to be maintained lower than the nozzle surface by a predetermined distance. The ink tanks 4a-4d are associated with corresponding ink circulating pumps 38a-38d, respectively, by which the ink under pressure is supplied from the ink tanks to the corresponding recording heads. Further, the ink tanks 4a-4d are connected to the corresponding recording heads 1a-1d, respectively, through ink return tubes 37a–37d through which the pressurized ink in the recording heads is returned to the corresponding ink tanks 4a–4d.

The liquid jet recording apparatus further includes a seamless belt 6 for feeding or conveying the recording medium 27. The seamless belt 6 has an outer high resistive (10 Ωcm or thereabout) layer having a thickness of the order of 50 μm and an inner surface earthed through idle rollers 9. The belt is charged by means of a charger 12a so that the outer surface of the belt becomes about 1500 volts. The recording medium 27 is also charged to have the negative or minus charge by means of a charger 12b so that the recording medium can be electrostatically attracted to the seamless belt 6, whereby the recording medium is conveyed in the direction X in response to the movement of the sealless belt 6. The belt 6 is rotated or turned in the direction X by means of a belt driving roller 7 driven by a motor 8.

A tension roller 10 is provided for applying the constant tension to the belt 6. Pinch rollers 11a and 11b are arranged on opposite sides of the charger 12b and are associated with the idle rollers 9a, 9b with the interposition of the belt portion so as to aid the attraction of the recording medium 27 to seamless belt 6. Particularly, the pinch roller 11a can also serve as a regist roller against which the leading edge of the recording medium is abutted to form a loop of the recording medium in a guide 13 thereby improving the perpendicularity of the leading edge of the recording medium 27 to the direction X. The recording media or recording papers 27 are fed from a cassette 26 one by one by means of a feed roller 16 and more directed to the regist roller 11a by means of a feeding roller 14 and a pinch roller 15.

Further, a cleaning unit 17 is provided for removing the paper powder and/or the non-recording discharged ink from the outer surface of the seamless belt 6. Incidentally, the reference numeral 18 designates an ejector tray for receiving the recording paper on which the image has been recorded.

Next, an operation of the liquid jet recording apparatus designed as mentioned above will be explained.

Figure 4:
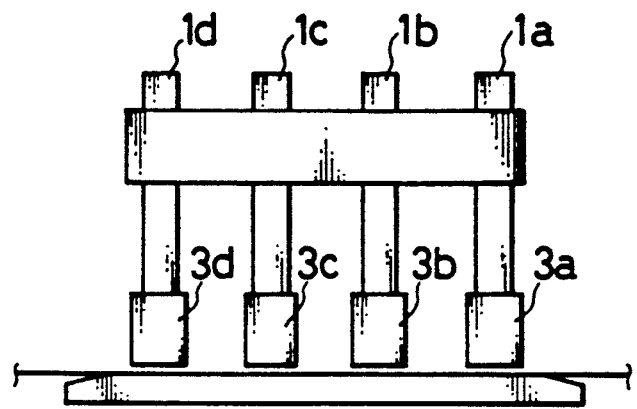
FIGS. 4 to 9 are explanatory views for explaining the operations of a head unit and a cap unit of the apparatus of FIG. 1, respectively.

FIGS. 4 to 9 are side views showing the recording head unit and the associated caps. More particularly, FIG. 4 shows a condition that a power source of the apparatus is turned OFF, where the orifice surfaces of the recording heads 1a–1d are closed or covered by the corresponding caps 3a–3d, whereby the evaporation of ink from the nozzle tips is prevented.

Figure 5:
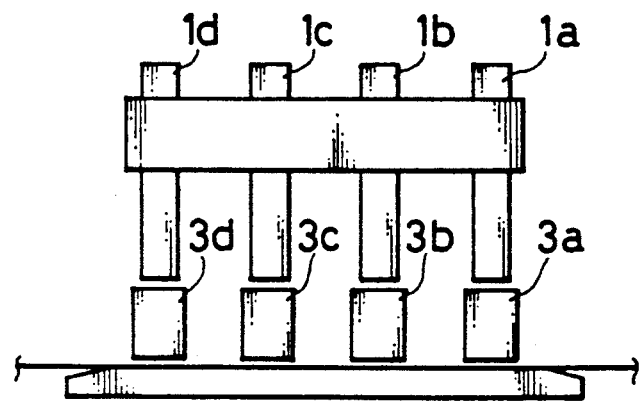
Figure 6:
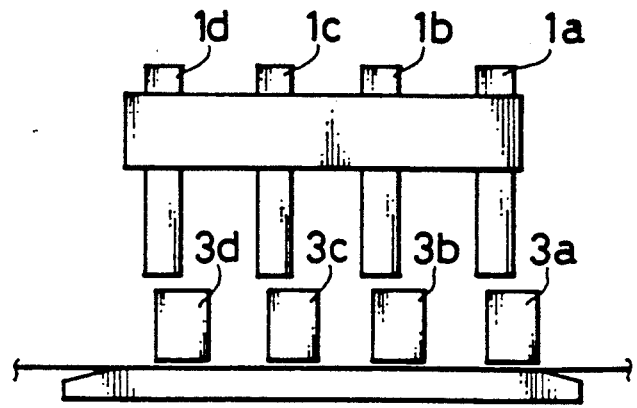
Figure 7:
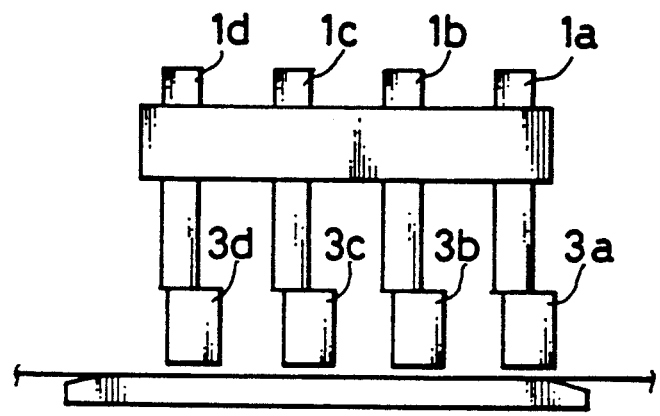
Figure 8:
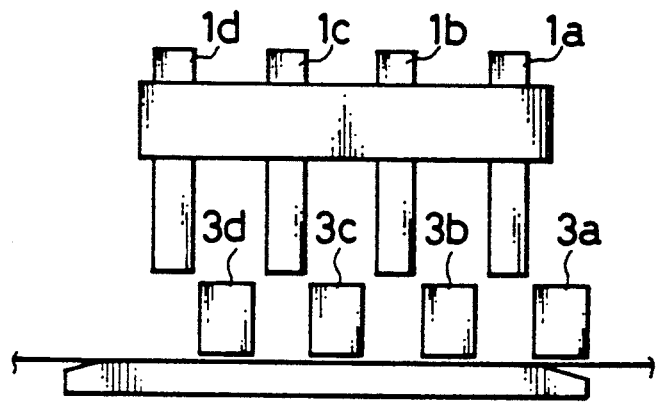

Under the circumstances, when the power source of the apparatus is turned ON, the recording head unit including the recording heads 1a–1d is lifted by the head shifting means 24 by 1 mm or thereabout (FIG. 5). In this condition, if a circulating signal is emitted, the cap unit including the caps 3a–3d is shifted by the cap shifting means 25 to a direction opposite to the direction X by a distance corresponding to a distance L shown in FIG. 3 (FIG. 6), and then, the head unit is lowered (FIG. 7). In this condition, the ink is circulated (between the ink tanks and the corresponding recording heads) by activating the ink circulating pumps 38a–38d (FIG. 1). Then, the recording head unit is lifted again (FIG. 6), and thereafter, the cap unit is returned to its original position (FIG. 5). Incidentally, the bubbles in the ink supply tubes 5 and in the recording heads are removed by the ink circulation.

On the other hand, if a non-recording discharging signal is emitted, the ink is discharged for the non-recording purpose (idle discharge, or pre-discharge from all of the nozzles by predetermined times. In this case, since the non-recording discharge of ink is effected before the recording operation is started, the ink is discharged toward the ink absorbing members 29 in the caps 3a–3d. Incidentally, although the non-recording discharge of ink is normally effected when the power source is turned ON or after a predetermined number of recording papers have been recorded, if the uneven or irregular recording occurs during the recording operation, the non-recording discharge of ink may be effected by pushing an appropriate start button.

Figure 9:
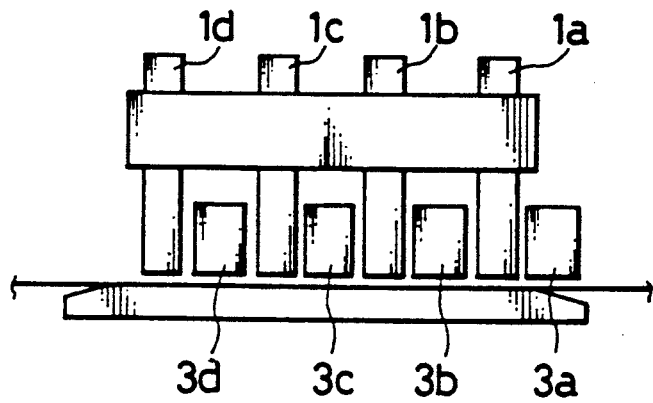

Next, the cap unit is shifted by means of the cap shifting means 25 to the direction opposite to the direction X to displace the caps 3a–3d from the moving paths of the recording heads 1a–1d (FIG. 8) Thereafter, the recording head unit is lowered between the caps so that the nozzles tips of the recording heads are positioned above the seamless belt 6 by about 4 mm (FIG. 9).

Then, a paper feeding motor (not shown) for rotating the feed roller 16 is activated to pick up the uppermost recording paper in the cassette 26 by means of the feed roller 16. The recording paper is guided by the guide 13 and is pinched by the feeding roller 14 and the pinch roller 15. The leading edge of the recording paper is detected by a photo-sensor (not shown) arranged immediately ahead of the regist roller 11a, and the paper feeding motor is turned OFF when a predetermined time is elapsed after the leading edge of the recording paper has reached the regist roller 11a. Meanwhile, the leading or front portion of the recording paper is curved or looped in the inverted V-shaped guide 13 so that the leading edge of the recording paper is positively abutted against the regist roller due to the rigidity of the recording paper to ensure the perpendicularity of the leading edge of the recording paper to the paper feeding direction X.

Then, the belt driving motor 8 and the chargers 12a, 12b are activated. The recording paper is introduced below the charger 12b while being pressed against the belt 6 by the pinch roller 11a. The outer surface of the belt 6 is charged to have the voltage of about 1500 V by means of the charger 12a, whereas, the recording paper is charged to have the minus charge by means of the charger 12b. Therefore, the recording paper is electrostatically attracted to the belt due to the electrostatic force caused by the positive or plus charge on the belt and the minus charge on the recording paper. Further, since the recording paper is pressed aqainst the belt 6 by means of the pinch roller 11b after it has passed through the charger 12b, the attraction of the recording paper to the belt is further ensured. The movement of the recording paper is counted by an appropriate counter activated in synchronization with the activation of the belt driving motor, so that the recording operation is started immediately after the leading edge of the recording paper has reached the recording heads.

After the recording operation regarding the recording paper has been finished, the recording paper is separated from the belt 6 at a bent portion of the belt wound around the belt driving roller 7, and then is ejected onto the ejector tray 18. After the recording paper has been ejected, the belt driving motor 8 is turned OFF and the chargers 12a, 12b are also deactivated.

Now, if the next recording operation is not desired, the recording head unit is lifted (FIG. 8), and then, the cap unit is returned to its original position (FIG. 5), and thereafter, the recording head unit is lowered, whereby the recording heads are covered by the corresponding caps (FIG. 4). In this point, the power source is turned OFF.

On the other hand, if the next recording operation is desired, first of all, it is detected or judged whether the non-recording discharge signal is emitted or not. If such signal is emitted, the ink is discharged for the non-recording purpose onto the belt while maintaining the recording heads in the condition shown in FIG. 9, and then the feed roller 16 is rotated; whereas, if such signal is not limited the feed roller is rotated without effecting the non-recording discharge of ink. In this way, the recording paper regarding the next recording paper is repeated in the same manner as mentioned above. The ink discharged on the belt is removed from the belt by means of the cleaning unit 17.

Figure 10B:
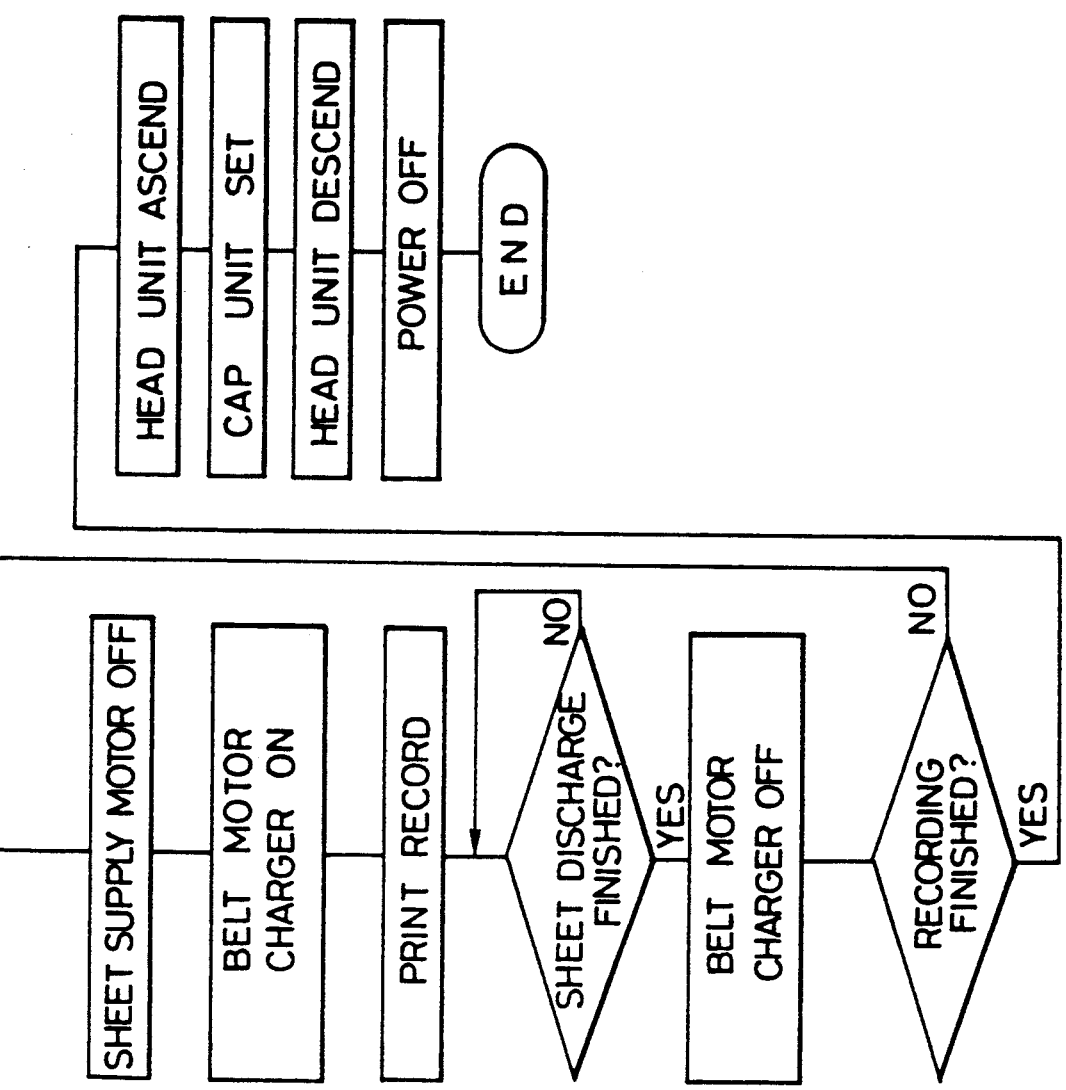
FIG. 10 is a flow chart for executing the on of the apparatus of FIG. 1.

Incidentally the above-mentioned operation of the liquid jet recording apparatus is shown in a flow chart of FIG. 10.

When the non-recording ink discharge operation is effected whenever each recording operation has been finished, the ink may be discharged for the non-recording recording purpose, for example, several times. Accordingly, in the liquid jet recording apparatus according to the present invention, the non-recording ink discharge can be effected onto the belt portion between two successive recording papers fed along the belt, and, thus, the through-top, i.e., the recording speed in the continuous paper feeding system is not reduced. Incidentally, since the non-recording ink discharge is required every 1-2 minutes, the non-recording ink discharge may be effected whenever several or ten-odd recording papers have been recorded in accordance with the recording speed of the liquid jet recording apparatus.

Further, in the illustrated embodiment, since it is designed that the recording paper is electrostatically attracted to the seamless belt, the ink mist generated during the non-recording ink discharge can also be attracted to the belt, thus preventing the ink mist from contaminating the interior of the apparatus and improving the reliability of the operation of the apparatus.

Incidentally, in the illustrated embodiment, while an example that the electrostatic force between the recording paper and the seamless belt is utilized as the paper conveying means was explained, the present invention is not limited to this example. It should be noted that the paper conveying means may be constituted by an air suction force, a drum or the like.

According to the present invention, since the liquid jet recording apparatus includes a conveying means for conveying the recording medium, a cleaning means for cleaning the conveying means, and a control means for discharging the recording liquid for non-recording purpose onto the conveying means, it is not needed to retract the recording heads from the recording position and the through top, i.e. the recording speed in the continuous recording system is not reduced, thus permitting the high speed recording.

Further, when the recording medium is conveyed by the electrostatic force between the recording medium and the belt, the ink mist generated during the non-recording ink discharge can be attracted to the belt, thus preventing the ink mist from contaminating the interior of the apparatus and improving the reliability of the operation of the apparatus.

Some explanation will be added for the above embodiment.

Although the ink supply to the recording head is carried out only through the tubes 5 (5a, 5b, 5c, 5d), it is possible and preferable to supply the ink to the head through the tubes 5, 37 (the discharge tubes 37 (37a, 37b, 37c, 37d) are so constructed that they can supply the ink from the ink tank) by capillary force generated corresponding to ink consumption by the head.

As for the construction of ink head shifting means 24 in the above embodiment, it is enough to cause the group of heads move upwardly and downwardly integrally. In detail, on-off control of a plunger for lift, or means utilizing a cam as motion transmitting member can be adopted. As for the construction of cap shifting means 25, it is enough to move the group of caps integrally. In detail, a slide mechanism utilizing a rail or the like for parallel shifting, or a mechanism comprising a guiding rack and a pinion can be adopted.

In the above embodiment, since the charge to the conveying belt 6 electrostatically attracting the recording medium is carried out until discharge completion of the recording medium, the conveying belt 6 charged is presented in the small gap between the belt of recording area formed by the recording heads 1a to 1d, and the recording head even after completion of recording. Accordingly, the ink mist generated upon recording can be attracted to the conveying belt as well as the ink mist upon said idle discharge, or pre-discharge.

In other words, even if the ink mist is presented at the recording area after completion of recording, it will be attracted by the charged conveying bolt. Thus, preferable environment suitable for next recording can be formed. There is no recording medium presented in the recording area after completion of recording, the ink mist upon recording can be removed by causing the surface of charged conveying belt to be passed or presented. By charging the conveying belt by the area which is larger than the length corresponding to the recording area in the conveying direction, the above advantage becomes more remarkable.

In addition, the conveying belt has a length which is longer than the recording medium, and the area which is larger than the conveyable recording medium is charged, so the ink mist effect can be fully realized by sufficiently utilizing the tendency of the ink mist advancing toward the end. By selecting the maximum charging width larger than the maximum sheet size conveyable, the ink mist removing effect can be fully shown, which means excellent recording can be maintained without complicating the apparatus construction. The ink mist adhered to the recording head itself needs the cleaning recording head by the cleaning blade as recovery means, which leads to increase of recording interruption, or increase of ratio of the idle discharge, or pre-discharge, but such disadvantages can be overcome or solved by the present invention.

Furthermore, upon conveyance of the continuous recording medium, the predetermined gap is formed between adjacent recording media normally, it is needless to say the ink mist removing effect relative to the whole width of the recording area can be obtained by charging the surface of the conveying belt of predetermined gap even upon the conveying mode without carrying out the idle discharge or pre-discharge.

Incidentally, in the case the conveying belt receives the idle discharge or predischarge or attracts the ink mist, it is desirable to clean such area. For this reason, even after the recording medium conveyance becomes unnecessary by the discharge, it is desirable to move the conveying belt until the above area passes by the cleaning acting area. Cleaning means can be constructed b providing the ink attracting layer on the conveying belt and reducing or restricting it not by the cleaning member but by a pair of reducing rollers as ink removing means.

It is noted the present invention covers the part or combination or the above embodiments.

In the above embodiment since the recording medium is charged itself, the uncharged conductive ink has the effect of attracting the ink mist because it is subject to generation of the induction charge.

This is especially effective for the scan type recording head.

The present invention renders excellent advantages especially in the recording head, apparatus of bubble jet type among the ink jet recording system. In detail, according to the present invention the defects that, in the case carrying out idle discharge or pre-discharge by moving the recording head and in the case forming air flow for increasing the air flow amount for effectively eliminating the ink mist, the recovery time becomes longer due to large heat loss near the recording head. In particular, since the ink mist increase can be substantially decreased, the above advantages is remarkable even when eliminating the ink mist together with the air flow.

As for typical construction and principle therefor, U.S. Pat. Nos. 4,723,129 and 4,740,796 can be advisable. The system can be applied to so-called on-demand type as well as continuous type, but the former is more desirable for the following reasons. In the case of on-demand type, the electro-thermal converting member is exposed to the liquid path on the liquid (ink) is held. At least one actuating signal giving sudden temperature increase corresponding to he recording information over the is applied, to generate the thermal energy at the electro-thermal converting member to thereby cause the film boiling at the acting surface of the recording head, so that the air bubble in the liquid (ink) can be formed exactly corresponding to the actuating signal. The liquid (ink) is discharged through the discharge opening due to growth and shrinkage of the air bubble to thereby form at least one droplet. Using the actuating signal as the pulse configuration is convenient to carry out the ink discharge with excellent in response since the growth and shrinkage of the air bubble is carried out immediately and properly. The actuating signals of this pulse configuration which are disclosed in U.S. Pat. Nos. 4,463,359 and 4,345,262 are suitable. In the case where the conditions disclosed in U.S. Pat. No. 4,313,124 which is related to the temperature increase at the heat acting surface is used, more excellent recording can be effected.

Incidentally, in addition to the construction of recording head comprising the combination of discharge opening, liquid path and electro-thermal converter which is described in the above patents (linear liquid path or normal liquid path, the construction in which the heat acting surface is disposed in the bent or curl area which is for example disclosed in U.S. Pat. Nos. 4,558,333 and 4,459,600 is included in the present invention. Furthermore, the construction in which the slit common to plural electro-thermal converter is made the discharge portion for the electro-thermal converter which is for example disclosed in Japanese Patent Laid-open No. 59-123670, and the construction in which he opening or absorbing the pressure wave of thermal energy corresponds to the discharge portion which is for example disclosed in Japanese Patent Laid-open No. 59-138461 can be adapted to the present invention.

As for the full-line type recording head, having a length corresponding to the maximum width of recording medium capable of being recorded by the recording device, the construction can be achieved by the integral combination of plural recording heads of the construction of the single recording head. In any case, the above advantage can be shown according to the present invention.

Furthermore, as for the recording mode of the recording device, in addition to the recording mode only for the main color such as black or the like, the present invention can be applied to the device having at least one of the colors of or full color by mixing colors which is made by constructing the recording head integrally or combining plural recording heads.

The endless rotary member having enough flatness, which is evenly charged and does not pass through the ink is suitable for the conveying member of the present invention.

What is claimed is:

1. A liquid jet recording apparatus comprising:
   a mounting portion for mounting a recording means for carrying out recording by discharging liquid;
   rotary conveying means for conveying a recording medium to which the liquid is applied by said recording means; and
   controlling means for controlling idle discharge for recovery or prevention of poor discharge from said recording means by controlling discharge of the liquid from said recording means onto a portion of a surface of said conveying means at which the recording medium to be conveyed is absent.

2. A liquid jet recording apparatus according to claim 1, further comprising means for cleaning said conveying means by eliminating the liquid from the portion of said conveying means which has received the liquid discharge from said recording means.

3. A liquid jet recording apparatus according to claim 1, wherein said conveying means includes a conveying belt electrostatically attracting the whole surface of the recording medium, and means for charging said conveying belt.

4. A liquid jet recording apparatus according to claim 1, wherein said controlling means controls the liquid discharge onto a portion of the surface of said conveying means located between adjacent recording media in a mode in which said conveying means conveys the recording media, each of said media has been cut into a predetermined size.

5. A liquid jet recording apparatus according to claim 1, wherein said recording means has an electro-thermal converting element for forming bubbles by applying thermal energy to the liquid for the liquid discharge, said converting element generating a film boiling in the liquid corresponding to an electric signal corresponding to a recording signal.

6. A liquid jet recording apparatus according to claim 3, wherein said conveying belt is wider than the recording medium and electrostatically attracts any mist created by discharging liquid during recording.

7. A liquid jet recording apparatus according to claim 1, wherein said rotary conveying means comprises a conveying belt and further comprising charging means for charging sad conveying belt including a surface thereof located between adjacent recording media in a plural recording media conveying mode of the conveying belt, wherein said conveying belt is wider than the recording medium and electrostatically attracts any mist created by discharging liquid during recording.

8. A liquid jet recording apparatus according to claim 1, wherein said rotary conveying means comprises a conveying belt and further comprising charging means for charging said conveying belt including a surface thereof located between adjacent recording media in a plural recording media conveying mode of the conveying belt, said charging means charging said conveying belt at a location before the recording medium contacts the conveying belt, in a conveying direction, wherein said conveying belt is wider than the recording medium and electrostatically attracts any mist created by discharging liquid during recording.

9. A liquid jet recording apparatus according to claim 1, wherein said recording means is color recording means having four recording heads disposed closely in a state in which full color recording can be carried out.

10. A liquid jet recording apparatus comprising:
a mounting portion for mounting a recording means for discharging liquid for recording;
conveying means for conveying a recording medium to which the liquid is applied by said recording means, said conveying means having a conveying belt moving endlessly and conveying belt charging means for electrostatically attracting the recording medium to said conveying belt;
controlling means for supplying a portion of said conveying belt, which is charged by said charging means and on which the recording medium is not carried, to a recording area adjacent said recording means, after completion of recording of the recording medium by said recording means; and
cleaning means for cleaning said conveying means.

11. A liquid jet recording apparatus according to claim 10, further including recovery means for carrying out liquid discharge to the portion of said conveying belt which is charged but does not carry the recording medium.

12. A liquid jet recording apparatus according to claim 10, wherein said conveying means has a member for pressing the recording medium onto a surface of said charged conveying belt before the recording medium reaches the recording area.

13. A liquid jet recording apparatus according to claim 10, further including a recording medium charging means for applying a charge to the recording medium having a reverse polarity of a polarity of said conveyor belt charging means.

14. A liquid jet recording apparatus according to claim 10, wherein said recording means includes a full line type recording head discharging the liquid and keeping a small gap between said recording head and the recording medium when discharging the liquid, said recording head having a discharge portion having a length corresponding to a width of the recording medium in a moving direction thereof and carrying out the recording in a recording position in the recording apparatus.

15. A liquid jet recording apparatus according to claim 14, further including moving means for moving said recording means between a position where said recording means is remote from said conveying means by a distance larger than the small gap during non-recording, a cap member for capping the liquid discharge portion of said recording means and means for inserting said cap member into a space between said recording means separated from said moving means and said conveying belt, said cap member for establishing a capped state upon non-recording.

16. A liquid jet recording apparatus according to claim 10, wherein said recording means has an electro-thermal converting element for forming bubbles by applying thermal energy to the liquid for the liquid discharge, said converting element generating a film boiling in the liquid corresponding to an electric signal corresponding to a recording signal.

17. A liquid jet recording apparatus according to claim 15, further including recovery means for carrying out liquid discharge to the portion of said conveying belt which is charged but does not carry the recording medium.

18. A liquid jet recording apparatus according to claim 17, wherein said recording means has an electro-thermal converting element for forming bubbles by applying thermal energy to the liquid for the liquid discharge, said converting element generating a film boiling in the liquid corresponding to an electric signal corresponding to a recording signal.

19. A liquid jet recording apparatus according to claim 10, further comprising charging means for charging said conveying belt including a surface thereof located between adjacent recording media in a plural recording media conveying mode of the conveying belt, wherein said conveying belt is wider than the recording medium and electrostatically attracts any mist created by discharging liquid during recording.

20. A liquid jet recording apparatus according to claim 10, further comprising charging means for charging said conveying belt including a surface thereof located between adjacent recording media in a plural recording media conveying mode of the conveying belt, said charging means charging said conveying belt at a location before the recording medium contacts the conveying belt, in a conveying direction, wherein said conveying belt is wider than the recording medium and electrostatically attracts any mist created by discharging liquid during recording.

21. A liquid jet recording apparatus according to claim 10, wherein aid recording means is color recording means having four recording heads disposed closely in a state in which full color recording can be carried out.

22. A liquid jet recording apparatus comprising:
a mounting portion for mounting a recording means for discharging a liquid to a recording medium by forming a bubble by a film boiling in the liquid by applying an electric signal corresponding to a recording signal, said recording means being provided with at least one recording head having an electro-thermal converting element for forming the bubble by applying thermal energy into the liquid and a discharge portion having a length corresponding to a width of the recording medium in a conveying direction thereof;
an endless conveying belt for electrostatically attracting the recording medium; and
charging means for charging said conveying belt including a surface thereof located between adjacent recording media in a plural recording media conveying mode of the conveying belt, wherein said conveying belt is wider than the recording medium and electrostatically attracts any mist created by discharging liquid during recording, and wherein said recording means includes controlling recording for supplying a portion of said conveying belt, which is charged by said charging means, but which does not carry the recording medium, to a recording area adjacent said a recording means after completion of recording of the recording medium by said recording means, and cleaning means for cleaning said conveying means.

23. A liquid jet recording apparatus according to claim 22, wherein said controlling means supplies the conveying belt until a surface of said conveying belt charged after completion of recording passes by a cleaning acting area of said cleaning means.

24. A liquid jet recording apparatus comprising:
a mounting portion for mounting recording means for discharging a liquid to a recording medium by forming a bubble by a film boiling in the liquid by applying an electric signal corresponding to a recording signal recording head provided with an electro-thermal converting element for forming the bubble by applying thermal energy, said recording means being provided with at least one recording head having an electro-thermal converting element for forming the bubble by applying thermal energy into the liquid and a discharge portion having a length corresponding to a width of the recording medium in a conveying direction thereof;
an endless conveying belt for electrostatically attracting the recording medium; and
charging means for charging said conveying belt including a surface thereof located between adjacent recording media in a plural recording media conveying mode of the conveying belt, wherein said conveying belt is wider than the recording medium and electrostatically attracts any mist created by discharging liquid during recording, wherein said recording means is a color recording means having four recording heads disposed closely in a state in which full color recording can be carried out and said recording apparatus includes controlling means for supplying a portion of said conveying belt, which is charged by said charging means, but which does not carry the recording medium, to a recording area adjacent said recording means after completion of recording of the recording medium by said recording means, and cleaning means for cleaning said conveying means.

25. A liquid jet recording apparatus according to claim 24, wherein said controlling means supplies the conveying belt until a surface of said conveying belt charged after completion of recording passes by a cleaning acting area of said cleaning means.

26. A liquid jet recording apparatus comprising:
a mounting portion for mounting a recording means for discharging liquid for recording;
conveying means for conveying a recording medium to which the liquid is applied by said recording means, said conveying means having a conveying belt moving endlessly and conveying belt charging means for electrostatically attracting the recording medium to said conveying belt;
controlling means for supplying a portion of said conveying belt, which is charged by said charging means and on which the recording medium is not carried, to a recording area adjacent said recording means, after completion of recording of the recording medium by said recording means; and
cleaning means for cleaning said conveying means, wherein said conveying belt is wider than the recording medium and electrostatically attracts any mist created by discharging liquid during recording.

27. A liquid jet recording apparatus according to claim 26, wherein said charging means charges said conveying belt including a surface located between adjacent recording media in a plural recording media conveying mode.

28. A liquid jet recording apparatus according to claim 26, wherein said charging means charges said conveying belt including a surface located between adjacent recording media in a plural recording media conveying mode, said charging means charging said conveying belt at a location before the recording medium contacts the conveying belt, in a conveying direction.

29. A liquid jet recording apparatus according to claim 26, wherein said recording means is color recording means having four recording heads disposed closely in a state in which full color recording can be carried out.

* * * * *

UNITED STATES PATENT AND TRADEMARK OFFICE
CERTIFICATE OF CORRECTION

PATENT NO. : 5,270,738          Page 1 of 5
DATED : December 14, 1993
INVENTOR(S) : Haruhiko TAKAHASHI, et al.

It is certified that error appears in the above-indentified patent and that said Letters Patent is hereby corrected as shown below:

COLUMN 1:

Line 31, "inexpensive," should read --inexpensive--;
Line 41, "it's" should read --it is--;
Line 45, "socalled" should read --so-called--.

COLUMN 2:

Line 21, "recording" should read --recording,--; and " "fog" like" should read --"fog"-like--;
Line 34, "pre-discharge" should read --pre-discharge,--;
Line 35, "the recording apparatus" should be deleted;
Line 42, "ink attracting" should read --ink-attracting--;
Line 43, "through top" should read --through-put--;
Line 50, "of" should read --of the--;
Line 55, "liquid" should read --liquid;--.

COLUMN 3:

Line 8, "setting" should read --jetting--;
Line 9, "a" should be deleted;
Line 37, "the" should be deleted;
Line 39, "a" should be deleted.
Line 37, "]et" should read --jet--.

UNITED STATES PATENT AND TRADEMARK OFFICE
CERTIFICATE OF CORRECTION

PATENT NO. : 5,270,738

DATED : December 14, 1993

INVENTOR(S) : Haruhiko TAKAHASHI, et al.

It is certified that error appears in the above-indentified patent and that said Letters Patent is hereby corrected as shown below:

COLUMN 4:

Line 43, "nozzles liquid" should read --nozzles when the liquid--;
Line 48, "non" should read --non- --;
Line 56, "tanks" should read --tank--.

COLUMN 5:

Line 16, "sealless" should read --seamless--;
Line 32, "more" should read --are--;
Line 68 "pre-discharge" should read --pre-discharge)--.

COLUMN 6:

Line 17, "nozzles" should read --nozzle--;
Line 42, "whereas," should read --whereas--.

COLUMN 7:

Line 1, "In" should read --At--;
Line 10, limited" should read --emitted,--;
Line 14, "on" should read --onto--;
Line 16, Incidentally" should read --Incidentally,--;
Line 22, "recording" should be deleted;

UNITED STATES PATENT AND TRADEMARK OFFICE
CERTIFICATE OF CORRECTION

PATENT NO. : 5,270,738   Page 3 of 5
DATED : December 14, 1993
INVENTOR(S) : Haruhiko TAKAHASHI, et al.

It is certified that error appears in the above-indentified patent and that said Letters Patent is hereby corrected as shown below:

Line 27, "through-top," should read --through-put,--;
Line 56, "through top," should read --through-put,--.

COLUMN 8:

Line 23, "1d," should read --1$d$--;
Line 30, "bolt." should read --belt.--;
Line 32, "There" should read --If there--;
Line 51, "the cleaning" should read --cleaning of the--;
Line 57, "the" should read --if the--;
Line 64, "the case" should read --case--;
Line 65, "discharge" should read --discharge,--; and "pre-discharge" should read --pre-discharge,--.

COLUMN 9:

Line 2, "b" should read --by--;
Line 8, "or" should read --of--;
Line 16, "head," should be deleted;
Line 17, "system." should read --systems.--;
Line 19, "case" should read --case of--; "discharge" should read --discharge,--; and "pre-discharge" should read --pre-discharge,--;
Line 20, "case" should read --case of--;
Line 25, "is" should read --are--;
Line 34, "on" should read --on which--;

UNITED STATES PATENT AND TRADEMARK OFFICE
CERTIFICATE OF CORRECTION

PATENT NO. : 5,270,738    Page 4 of 5
DATED :    December 14, 1993
INVENTOR(S) : Haruhiko TAKAHASHI, et al.

It is certified that error appears in the above-indentified patent and that said Letters Patent is hereby corrected as shown below:

Line 36, "he" should read --the--, and "over. the" should be deleted;
Line 46, "in" should be deleted;
Line 59, "path," should read --path),--;
Line 60, "curl" should read --curved--;
Line 67, "he" should read --the--;
Line 68, "or" should read --for--.

COLUMN 10:

Line 16, "the colors" should read --the different plural colors--; and "of" (second occurrence) should be deleted;
Line 51, "has" should read --having--;
Line 67, "sad" should read --said--.

COLUMN 12:

Line 44, "aid" should read --said--;
Line 51, "a" (second occurrence) should be deleted.

COLUMN 13:

Line 1, "means" should read --apparatus--;
Line 2, "recording" should read --means--;
Line 17, "a" (second occurrence) should be deleted;

UNITED STATES PATENT AND TRADEMARK OFFICE
CERTIFICATE OF CORRECTION

PATENT NO. : 5,270,738
DATED : December 14, 1993
INVENTOR(S) : Haruhiko TAKAHASHI, et al.

It is certified that error appears in the above-indentified patent and that said Letters Patent is hereby corrected as shown below:

Line 19, "recording head provided with an" should be deleted;
Line 20, entire line should be deleted;
Line 21, "bubble by applying thermal energy" should be deleted.

Signed and Sealed this

Fourth Day of October, 1994

Attest:

BRUCE LEHMAN

Attesting Officer

Commissioner of Patents and Trademarks